(12) United States Patent
Saito et al.

(10) Patent No.: US 8,795,041 B2
(45) Date of Patent: Aug. 5, 2014

(54) CONDITIONED AIR SUPPLY METHOD AND SUPPLY SYSTEM FOR AIRCRAFT

(75) Inventors: Hidefumi Saito, Kyoto (JP); Kay Takao, Nagoya (JP)

(73) Assignees: Shimadzu Corporation, Kyoto-shi (JP); Mitsubishi Heavy Industries, Ltd., Tokyo (JP)

( * ) Notice: Subject to any disclaimer, the term of this patent is extended or adjusted under 35 U.S.C. 154(b) by 1208 days.

(21) Appl. No.: 12/516,058

(22) PCT Filed: Nov. 28, 2006

(86) PCT No.: PCT/JP2006/323716
§ 371 (c)(1),
(2), (4) Date: May 22, 2009

(87) PCT Pub. No.: WO2008/065709
PCT Pub. Date: Jun. 5, 2008

(65) Prior Publication Data
US 2010/0043794 A1 Feb. 25, 2010

(51) Int. Cl.
*B64D 13/02* (2006.01)
*B64D 13/00* (2006.01)
*A61M 16/00* (2006.01)

(52) U.S. Cl.
USPC ............ 454/71; 454/74; 454/76; 128/204.22

(58) Field of Classification Search
USPC .................. 454/58, 63, 66, 69–77, 103, 115;
244/122 R; 128/202.26, 204.22,
128/204.21, 204.23, 204.26, 204.18; 62/78,
62/86, 172
See application file for complete search history.

(56) References Cited

U.S. PATENT DOCUMENTS

| 2,516,805 | A | | 7/1950 | Rother et al. |
| 5,071,453 | A | * | 12/1991 | Hradek et al. ................. 96/111 |
| 5,151,166 | A | * | 9/1992 | Harral et al. .................. 205/784 |
| 5,261,855 | A | * | 11/1993 | Law et al. ....................... 454/76 |
| 5,590,852 | A | * | 1/1997 | Olson ........................ 244/118.5 |
| 5,791,982 | A | | 8/1998 | Curry et al. |
| 6,551,184 | B1 | | 4/2003 | Mayer et al. |
| 6,655,168 | B2 | | 12/2003 | Mitani et al. |
| 6,666,039 | B2 | | 12/2003 | Mitani et al. |
| 6,997,970 | B2 | | 2/2006 | Crome |
| 2007/0102576 | A1 | * | 5/2007 | McCoy et al. ............ 244/118.5 |

FOREIGN PATENT DOCUMENTS

| DE | 19534025 C1 | 11/1996 |
| EP | 0808769 A2 | 11/1997 |
| JP | 10-505809 A | 6/1988 |

(Continued)

OTHER PUBLICATIONS

English translation of Mitani et al.; JP 2003-312596; Nov. 2003.*
H. Saito et al. "Advanced Air Conditioning System," Japan Society for Aeronautical and Space Sciences; Japan Aeronautical Engineer's Association; Oct. 2005, Nagoya International Conference Hall; pp. 594-600, cited in spec.

(Continued)

*Primary Examiner* — Henry Yuen
*Assistant Examiner* — Hung D Nguyen
(74) *Attorney, Agent, or Firm* — Westerman, Hattori, Daniels & Adrian, LLP

(57) ABSTRACT

When conditioned air is supplied in an aircraft, the conditioned air in which at least one of oxygen concentration and humidity is adjusted is generated in the aircraft. The generated conditioned air is blown via a plurality of air blow-off ports 40a disposed inside the aircraft cabin so that the conditioned air reaches face disposition regions of passengers H in a plurality of seat locations inside the cabin.

8 Claims, 10 Drawing Sheets

(56) References Cited

FOREIGN PATENT DOCUMENTS

| JP | 2003-312596 A | * | 11/2003 |
| JP | 2005-112005 A | | 4/2005 |
| JP | 2006-102061 A | | 4/2006 |
| WO | 96/09205 A1 | | 3/1996 |
| WO | 99/48756 A1 | | 9/1999 |

OTHER PUBLICATIONS

International Search Report of PCT/JP2006/323716, date of mailing Feb. 6, 2007.
Extended European Search Report dated Apr. 2, 2013 in European Patent Office Application No. 06833520.7.

* cited by examiner

CONDITIONED AIR SUPPLY METHOD AND SUPPLY SYSTEM FOR AIRCRAFT

TECHNICAL FIELD

The present invention relates to a method and a system for supplying conditioned air at least one of oxygen concentration and humidity of which has been adjusted into a cabin of an aircraft such as a fixed-wing aircraft or a rotary-wing aircraft.

BACKGROUND

Several problems are associated with conditioning of air inside cabins of aircrafts currently in operation. For example, inboard pressure in an aircraft flying at a high altitude is made higher than outboard pressure by pressurization, but in consideration for a fuselage strength, the inboard pressure after the pressurization is set lower than a pressure on the earth's surface. More specifically, setting the inboard pressure to a pressure (75.27 kPa) at 2438 m (8000 ft) has been approved for operation. However, in such operation, an oxygen partial pressure of air inside the cabin becomes about ¾ of that on the earth's surface. Furthermore, a humidity of air inside the cabin decreases due to ventilation. Such decrease in oxygen partial pressure and humidity of air inside the cabin decreases the comfort level of passengers.

Accordingly, it has been suggested to separate the air introduced from outside the airplane into oxygen-enriched air and nitrogen-enriched air with a selectively permeable membrane, supply the oxygen-enriched air for air conditioning into a cabin, and increase an oxygen partial pressure of the entire air inside the cabin, or to recover moisture contained in the air flowing out of the cabin and improve humidity of air inside the cabin by reusing this moisture (see Patent Documents 1, 2 and Non-Patent Document 1). It has also been suggested to supply oxygen-enriched air via an oxygen mask to each passenger in the cabin for emergency when the cabin is decompressed or for medical treatment (see Patent Document 3).

Patent Document 1: U.S. Pat. No. 6,655,168.
Patent Document 2: U.S. Pat. No. 6,666,039.
Patent Document 3: U.S. Pat. No. 6,997,970.
Non-Patent Document 1: Saito Hidefumi and three others. "Advanced Air Conditioning System". Japan Society for Aeronautical and Space Sciences, Japan Aeronautical Engineer's Association. October 2005, Nagoya International Conference Hall, Preprints of 43rd Symposium on Airplane Technology, pages 594-600.

DISCLOSURE OF THE INVENTION

Problem to be Solved by the Invention

The following problems are associated with conditioning of air inside a cabin performed by conventional technology.

With the conventional technology described in Patent Document 1 and Non-Patent Document 1, oxygen-enriched air is used to increase oxygen partial pressure of the entire air inside the cabin. However, the oxygen-enriched air introduced into the cabin is diluted by the outboard air introduced into the cabin for ventilation. Therefore, for example, when an aircraft flight altitude is 2438 m (8000 ft), the oxygen partial pressure of the entire air inside the cabin can be easily maintained at an oxygen partial pressure corresponding to an altitude of 2134 m (7000 ft), but an excessively high oxygen-enriched air supply capacity is necessary to maintain the oxygen partial pressure of the entire air inside the cabin at an oxygen partial pressure corresponding to an altitude of 1829 m (6000 ft). Further, where the oxygen partial pressure of the entire air inside the cabin is modified, safety against fire cannot be guaranteed because even though the onboard equipment of the aircraft is nonflammable, various items brought in by the passengers are not necessarily nonflammable.

In the conventional technology described in Patent Document 2, the air containing the recovered moisture is used for improving humidity of the entire air inside the cabin. As a result, condensation in the zones affected by the outboard low temperature at a high altitude becomes a problem. Furthermore, equipment for generating the conditioned air is increased in size and piping for supplying the conditioned air also becomes larger, thereby increasing the production cost. In other words, although it is sufficient to improve only the air for breathing in the zone around the passenger's face or the air that comes into contact with mucous membranes of mouth and nose, the oxygen-enriched air or humidified air is supplied into space for which the supply is unnecessary, thereby creating problems associated with cost, guaranteed safety against fire, condensation, and the like.

Because the oxygen-enriched air supplied according to the conventional technology described in the aforementioned Patent Document 3 is used during extreme drop in onboard pressure caused by an accident or the like and during medical treatment of a sick person, the oxygen partial pressure of this air is higher than the oxygen partial pressure of the air on the earth's surface. However, where the oxygen partial pressure of air at a high altitude is higher than the oxygen partial pressure of the air on the earth's surface, the oxygen concentration in the air becomes extremely high. As a result, even the onboard equipment that is nonflammable becomes easily combustible and the probability of fire occurrence is further increased in the aircraft because various items brought in by the passengers are not necessarily nonflammable.

It is an object of the present invention to provide conditioned air supply method and supply system for an aircraft that can resolve the above-described problems.

A feature of the conditioned air supply method for an aircraft in accordance with the present invention is in generating conditioned air in which at least one of oxygen concentration and humidity is adjusted in the aircraft, and blowing the generated conditioned air via a plurality of air blow-off ports disposed inside a cabin of the aircraft so that the conditioned air reaches each of face disposition regions of passengers in a plurality of seat locations inside the cabin.

With the method in accordance with the present invention, by blowing the conditioned air in a converging manner so that it reaches each of the face disposition regions of passengers inside the cabin, it is possible to remarkably reduce a flow rate of the conditioned air having improved oxygen partial pressure and humidity by comparison with the case in which oxygen partial pressure and humidity of the entire air inside the cabin are increased. Furthermore, because oxygen concentration increases only in some regions when the oxygen concentration is adjusted, the comfort level is raised with making it easier for the passengers to breathe without increasing the probability of fire occurrence; in addition, because humidity increases only in some regions when the humidity is adjusted, the comfort level of the passengers can be raised without increasing the probability of condensation occurrence.

The face disposition region as referred to herein is a region in which the face of a seating passenger is usually disposed, and usually the face of a passenger is disposed in the region when the head is supported by a seat headrest.

The conditioned air may be blown toward the face disposition region, or it may be blown toward the vicinity of the face disposition region, or it may be blown toward the face disposition region and the vicinity of the face disposition region, provided that it reaches to the face disposition region.

In the method in accordance with the present invention, it is preferred that the conditioned air is conditioned so that an oxygen concentration thereof is higher than an oxygen concentration in the air on the earth's surface and an oxygen partial pressure thereof is lower than an oxygen partial pressure in the air on the earth's surface. As a result, because oxygen concentration of the supplied oxygen-enriched air is higher than that of the air on the earth's surface and the oxygen partial pressure of the supplied oxygen-enriched air becomes lower, the probability of fire occurrence can be further reduced. In this case, it is preferred that a pressure inside the cabin of the flying aircraft is measured, a target partial pressure that exceeds a value obtained by multiplying the measured pressure inside the cabin by an oxygen concentration ratio in the air on the earth's surface and that is equal to or less than an oxygen partial pressure in the air on the earth's surface is found, and oxygen-enriched air comprising oxygen of the found target partial pressure is generated as the conditioned air by an oxygen-enriched air generator provided in the aircraft. Consequently, the comfort level can be certainly improved by making it easier for the passengers to breathe without increasing the probability of fire occurrence.

In the method in accordance with the present invention, it is preferred that the conditioned air is conditioned so that a humidity thereof is higher than an average humidity of the entire air inside the cabin. As a result, the comfort level can be raised by supplying humidified air to the passengers.

The conditioned air supply system for an aircraft in accordance with the present invention comprises an oxygen-enriched air generator that generates oxygen-enriched air as conditioned air in the aircraft; a measurement device that measures a pressure inside a cabin of the aircraft; a storage device that stores a preset relationship between a pressure inside the cabin and a target partial pressure; the relationship being set so that the target partial pressure exceeds a value obtained by multiplying the pressure inside the cabin by an oxygen concentration ratio in the air on the earth's surface and is equal to or less than an oxygen partial pressure in the air on the earth's surface; a target partial pressure determination device that finds the target partial pressure on the basis of the relationship and the measured pressure inside the cabin; a control device that controls the oxygen-enriched air generator so that an oxygen partial pressure of the generated conditioned air becomes the target partial pressure; a piping having a plurality of air blow-off ports connected to the oxygen-enriched air generator, and the air blow-off ports being disposed in locations in which the conditioned air can be blown so as to reach respective face disposition regions of passengers in a plurality of seat locations inside the cabin. As a result, the conditioned air in which oxygen concentration has been adjusted can be supplied by the method in accordance with the present invention with the system in accordance with the present invention.

In the system in accordance with the present invention, it is preferred that the piping has a plurality of branching ends, and the branching ends are configured by a plurality of ducts, each duct being attached to each of a plurality of seats or to a fuselage in the aircraft; the air blow-off port is provided in each duct; and each duct can change a posture thereof between a usage posture in which the conditioned air is blown from the air blow-off port so as to reach the face disposition region and a withdrawal posture in which it is disposed in a region that does not interfere with a movement region of a passenger inside the cabin. In this case, it is preferred that the blow-off direction of the conditioned air from the air blow-off port can be adjusted. It is preferred that each duct is swingably attached to the seat or the fuselage so that the duct can change the posture between the usage posture and the withdrawal posture. Alternatively, the duct is preferably configured by a flexible tube so that the duct can change the posture between the usage posture and the withdrawal posture. As a result, the conditioned air is supplied to the passengers only when necessary, and when the conditioned air is not required, the ducts can be prevented from inhibiting the movement of passengers. A movement region of a passenger is a region through which a passenger usually passes when moving inside the cabin. Furthermore, it is preferred to be able to select a configuration in which a mask that is attachable to a passenger face and a flexible tube connected to the mask are provided, the tube is detachably attached to the piping, and the conditioned air introduced from the air blow-off port into the tube attached to the piping is supplied to the passenger via the mask. Because the tube attached to the mask is detachably attached to the piping, the oxygen-enriched air can be reliably supplied via the mask when the passenger desires, and because the mask can be discarded after use, this configuration is preferred from the standpoint of sanitary.

In the system in accordance with the present invention, it is preferred that the piping has a plurality of nozzles, and each nozzle is attached to each of a plurality of seats or to a fuselage in the aircraft; the air blow-off port and an auxiliary air blow-off port are provided in each nozzle; in each nozzle, the auxiliary air blow-off port is disposed in a location in which the conditioned air is blown toward a region separated from the face disposition region; and each nozzle is provided with a mechanism for adjusting a blow-off flow rate of the conditioned air so that the blow-off flow rate of the conditioned air from the auxiliary air blow-off port decreases when the blow-off flow rate of the conditioned air from the air blow-off port increases, and the blow-off flow rate of the conditioned air from the auxiliary air blow-off port increases when the blow-off flow rate of the conditioned air from the air blow-off port decreases. As a result, the flow rate of conditioned air necessary for the passenger is adjusted and the remaining conditioned air is scattered inside the cabin, thereby making it possible to maintain an almost constant supply of air having improved oxygen partial pressure and humidity and stabilize the oxygen partial pressure and humidity of the supplied air.

It is preferred that the oxygen-enriched air generator comprises a selectively permeable membrane that separates high-pressure air supplied from an air supply source under a pressure higher than a cabin pressure into oxygen-enriched air and nitrogen-enriched air, a conditioning chamber into which the oxygen-enriched air separated by the selectively permeable membrane and air whose oxygen concentration is lower than that of the oxygen-enriched air separated by the selectively permeable membrane are introduced, and a flow rate control valve for the oxygen-enriched air introduced into the conditioning chamber, and a moisture regenerator that recovers moisture contained in the air discharged from the cabin and humidifies the air inside the conditioning chamber with the recovered moisture is provided. As a result, the comfort level can be raised by humidifying the oxygen-enriched air supplied to the passenger. In this case, it is preferred that an oxygen partial pressure determination device that finds an oxygen partial pressure of the oxygen-enriched air introduced from the conditioning chamber into the piping is provided, and an opening degree of the flow rate control valve is adjusted by the control device so as to reduce a difference between the found target partial pressure and the found oxygen partial pressure. As a result, the oxygen partial pressure of the oxygen-enriched air can be easily controlled.

Effect of the Invention

In accordance with the present invention, the air inside an aircraft cabin can be appropriately improved, thereby making it possible to raise the comfort level of the passengers at a low cost without creating a problem of fire or condensation.

EXPLANATION OF REFERENCE NUMERALS

1 . . . pressurized air supply device; 5a . . . compressor; 8 . . . cabin; 8a . . . fuselage; 16 . . . oxygen-enriched air generator; 16a . . . selectively permeable membrane; 16b, 16c, 16d . . . flow rate control valve; 16e . . . conditioning chamber; 19 . . . control device; 40 . . . piping; 40A . . . duct; 40a, 140a, 240a . . . air blow-off port; 42 . . . pressure sensor; 43 . . . seat; 50 . . . mask; 51 . . . tube; 80 moisture regenerator; 140b . . . auxiliary air blow-off port; H . . . passenger.

BEST MODE FOR CARRYING OUT THE INVENTION

Figure 1:
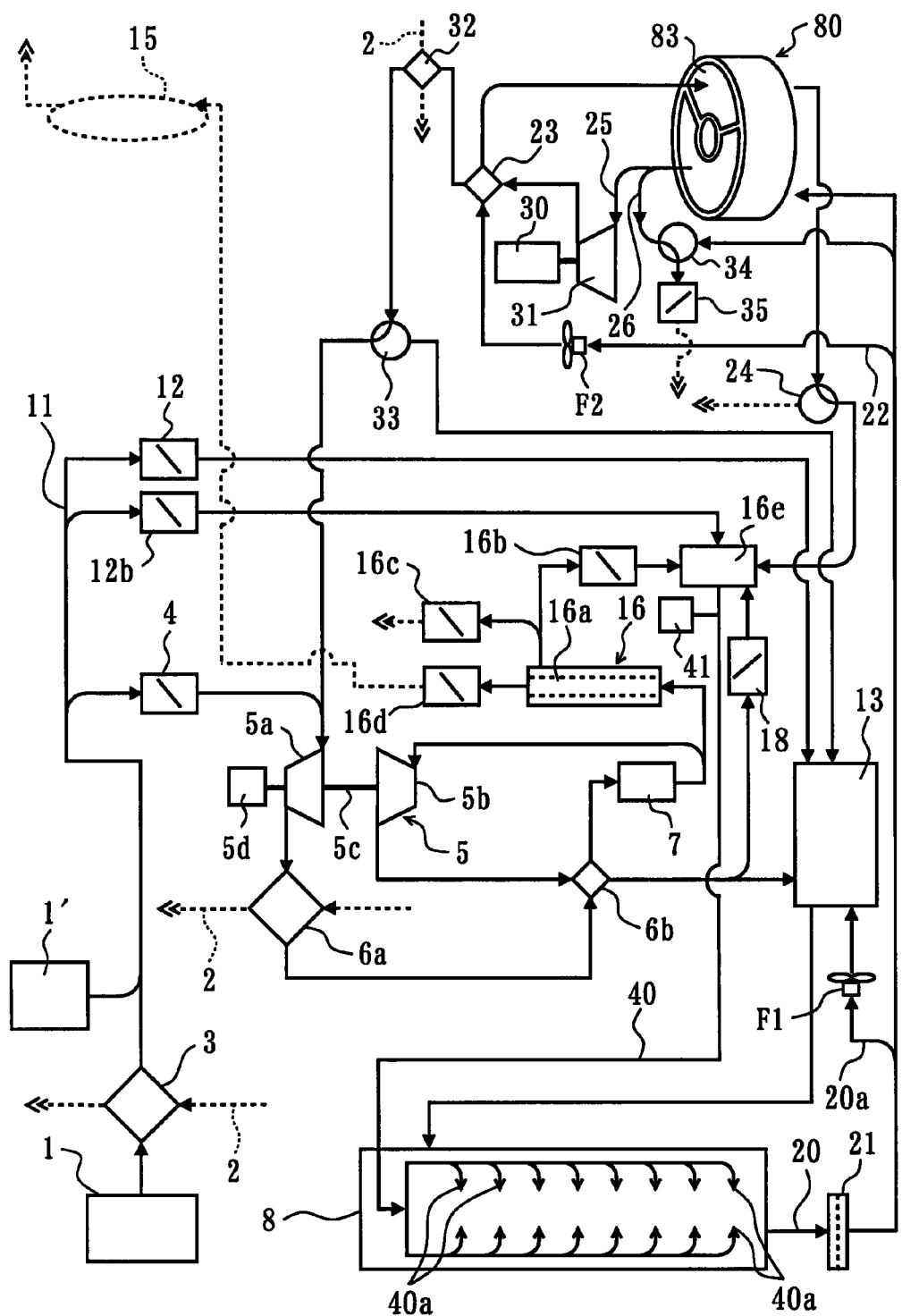
FIG. 1 A structural explanatory drawing of a conditioned air supply system for an aircraft of an embodiment of the present invention.

A conditioned air supply system for an aircraft shown in FIG. 1 has a pre-cooler 3 that cools pressurized air from a pressurized air supply device 1 with outboard air passing through a ram air passage 2. An aircraft engine or an electric compressor installed in the aircraft can be used as the pressurized air supply device 1, and air extracted from the engine or air compressed by the compressor can be supplied as the pressurized air. The air cooled in the pre-cooler 3 is guided via a flow rate control valve 4 into a radial compressor 5a to be compressed almost adiabatically. As a result, the pressurized air supply device 1 and the radial compressor 5a constitute a high-pressure air supply source in accordance with the present invention. The air compressed by the radial compressor 5a is cooled in a main cooler 6a and a first regenerative heat exchanger 6b and then guided into a water separator 7 to trap moisture. When the aircraft is on the earth's surface and the engine is stopped, the compressed air is guided into the radial compressor 5a by an auxiliary pressurized air supply device 1' configured by an onboard auxiliary power unit or an outboard pressurized air supply unit.

Part of the high-pressure air from which moisture has been removed in the water separator 7 is guided into an oxygen-enriched air generator 16, and the rest is guided into an expansion turbine 5b. A selectively permeable membrane 16a in the form of hollow fiber that constitutes the oxygen-enriched air generator 16 has an air oxygen permeability higher than a nitrogen permeability. As a result, the air supplied from the high-pressure air supply source is separated by the selectively permeable membrane 16a into nitrogen-enriched gas and oxygen-enriched gas. In the oxygen-enriched air generator 16, part of the oxygen-enriched gas separated by the selectively permeable membrane 16a is introduced via a first flow rate control valve 16b into a conditioning chamber 16e, and the rest can be released into the outboard air via a second flow rate control valve 16c. The nitrogen-enriched gas is introduced via a third flow rate control valve 16d into a fuel surrounding region 15 and then released into the outboard air via a release channel. In the present embodiment, the flow rate control valves 16b, 16c, 16d function as flow rate control valves for the oxygen-enriched air introduced into the conditioning chamber 16e. Thus, the flow rate of air passing through the selectively permeable membrane 16a changes depending on the change of opening degree of the flow rate control valves 16b, 16c, 16d, and the flow rate of oxygen-enriched air introduced into the conditioning chamber 16e is adjusted.

The air guided into the expansion turbine 5b expands almost adiabatically, thereby generating cold air. As a result, the compressor 5a and the expansion turbine 5b constitute an air cycle type cooling device 5. The expansion work of the expansion turbine 5b is used as a compressive power by being transmitted to the compressor 5a via a shaft 5c. A motor 5d for providing auxiliary power necessary for driving the compressor 5a is mounted on the shaft 5c. The cold air generated by the air cycle type cooling device 5 is heated in the first regenerative heat exchanger 6b, part of the heated air is introduced into a cabin 8 of the aircraft via a mixing chamber 13, and the rest is introduced via a flow rate control valve 18 into the conditioning chamber 16e. The cabin 8 includes not only the passenger cabin space of a passenger aircraft but also the cockpit space.

Part of the air from the pressurized air supply device 1 is guided from a bypass air channel 11 into a hot air modulator valve 12 and a regulation valve 12b without passing through the air cycle type cooling device 5. The air guided into the hot air modulator valve 12 is introduced from the mixing chamber 13 into the cabin 8, and the air guided into the regulator valve 12b is introduced into the conditioning chamber 16e.

Part of the air in the cabin 8 flows out an outflow air channel 20, then it is filtered with a filter 21 to remove dust or smell and guided into the mixing chamber 13 by a fan F1 via a branching channel 20a that branches off the outflow air channel 20, and then returns into the cabin 8.

Part of the air that passed through the filter 21 is reached to a moisture regenerator 80 via the outflow air channel 20 and a first branching air channel 22 that branches off the outflow air channel 20.

Figure 2:
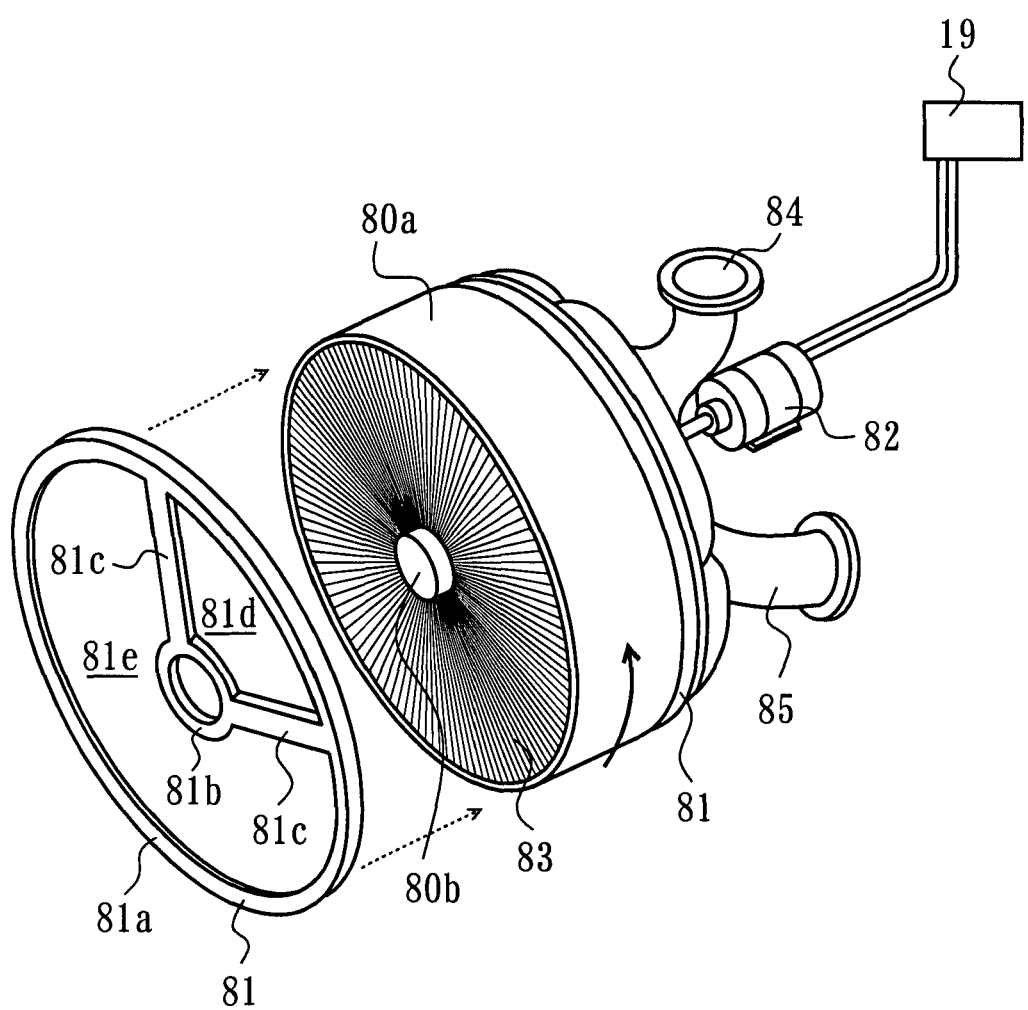
FIG. 2 A perspective view illustrating a moisture regenerator of the conditioned air supply system for an aircraft of the embodiment of the present invention.

As shown in FIG. 2, in the moisture regenerator 80, a large number of moisture adsorption units 83 are provided in a form of honeycomb inside a rotary drum 80a, and the longitudinal direction thereof extends in the rotation axis direction of the rotary drum 80a. The inside of each moisture adsorption unit 83 is packed with an adsorbent. The adsorbent constituting the moisture adsorption unit 83 adsorbs moisture contained in the air and releases the adsorbed moisture when heated to a temperature higher than that during adsorption. The adsorbent can be composed of a water molecule adsorbing substance such as silica gel.

Separators 81 are joined to both end surfaces of the rotary drum 80a via a sealing member (not shown in the figures) so as to be able to rotate relatively. Each separator 81 is configured by connecting an outer ring 81a and an inner ring 81b by two arms 81c and fixed to the aircraft fuselage. A central shaft 80b of the rotary drum 80a is rotatably supported by the inner ring 81b of each separator 81 via a bearing (not shown in the figure). A motor 82 is connected to the central shaft 80b, and the rotary drum 80a rotates when the motor 82 is driven by a signal from a control device 19. Two regions 81d and 81e are partitioned by the two arms 81c between the outer ring 81a and the inner ring 81b in each separator 81. In each separator 81, the region 81d is connected to the first branching air channel 22 via a piping joint 84, and the other region 81e is connected to the outflow air channel 20 via a piping joint 85. Where the motor 82 is driven by a signal from the control device 19, the rotary drum 80a rotates, and each moisture adsorption unit 83 is switched between a state in which it is connected to the first branching air channel 22 and a state in which it is connected to the outflow air channel 20.

The air flowing through the first branching air channel 22 is guided by a fan F2 to a second regenerative heat exchanger 23 and heated, for example, to 80° C. to 120° C. The temperature of air guided from the cabin 8 into the outflow air channel 20 is, for example, 20° C. to 30° C. As a result, the moisture adsorption units 83 become low temperature when the air that is introduced from the cabin 8 via the outflow air channel 20 flows therein, therefore the absorbent absorbs water molecules contained in the air flowing out of the cabin 8. By contrast, the moisture adsorption units 83 become high temperature when the air that is introduced via the first branching air channel 22 flows therein, therefore the adsorbent releases water molecules that have been absorbed in the air introduced via the first branching air channel 22 and the adsorbent is thereby regenerated. As a result, water molecules contained in the air flowing out of the cabin 8 are released into the air flowing through the first branching air channel 22 after they have been adsorbed by the adsorbent, and the adsorbent is regenerated so as to be reused.

The air that flows in the first branching air channel 22 passes through the moisture regenerator 80 and is then guided to a switching valve 24. The switching valve 24 can switch the air channel between a state in which the air guided to the switching valve is released to the outboard area and a state in which the air is introduced into the conditioning chamber 16e. As a result, the moisture regenerator 80 recovers moisture contained in the air discharged from the cabin 8 and can humidify the air in the conditioning chamber 16e by the recovered moisture.

The outflow air channel 20 is branched into a second branching air channel 25 and a third branching air channel 26 downstream of the moisture regenerator 80. The second branching air channel 25 is led to a compressor 31 driven by a motor 30, and part of the air from which moisture has been adsorbed by the moisture absorption units 83 is almost adiabatically compressed. The air that has been heated by compression with a compressor exchanges heat with the air flowing through the first branching air channel 22 in the second regenerative heat exchanger 23 and is cooled by the outboard air passing through the ram air channel 2 in a radiator 32, so that the air is cooled close to normal temperature and then selectively introduced into the radial compressor 5a and mixing chamber 13 via a switching valve 33. The third branching air channel 26 is connected to an outflow valve 35 via a switching valve 34. The switching valve 34 is switched between a state in which the outflow valve 35 is connected to the third branching flow channel 26 and a state in which the outflow valve 35 is connected to the outflow air channel 20.

The oxygen-enriched air separated by the selectively permeable membrane 16a is introduced into the conditioning chamber 16e via the valves 16b, 16c, and 16d, and the air with an oxygen concentration lower than that of the oxygen-enriched air separated by the selectively permeable membrane 16a is introduced into the conditioning chamber 16e via the valves 12b, 18, and 24. As a consequence, the oxygen partial pressure of the oxygen-enriched air separated by the selectively permeable membrane 16a is adjusted in the conditioning chamber 16e, as a result the oxygen-enriched air generator 16 generates conditioned air.

Figure 3:
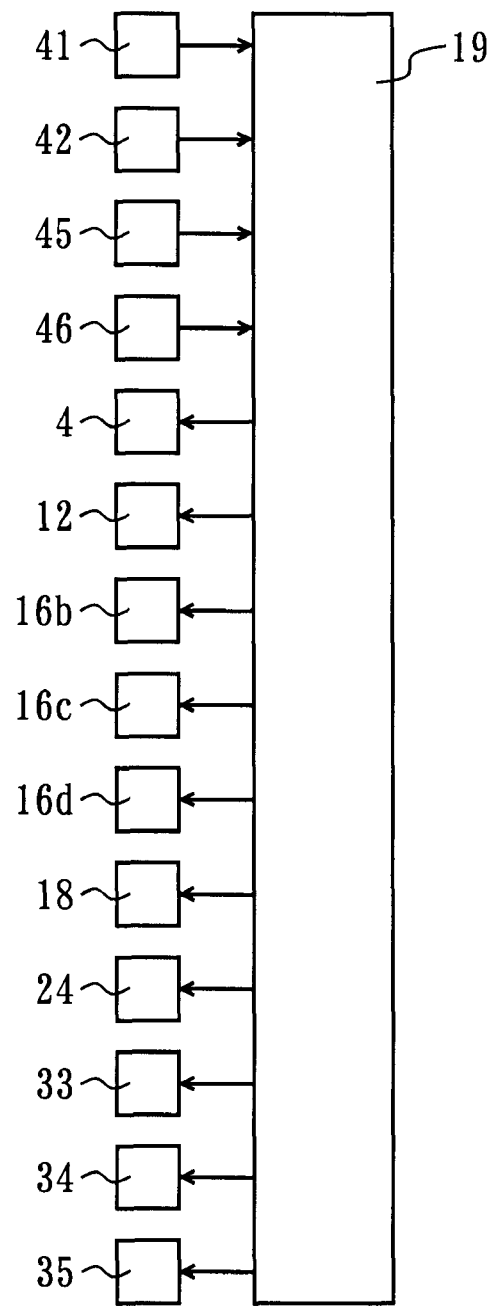
FIG. 3 A diagram illustrating a control configuration of the conditioned air supply system for an aircraft of the embodiment of the present invention.

The conditioned air is introduced from the conditioning chamber 16e into a piping 40 and introduced via the piping 40 into the cabin 8. An oxygen concentration sensor 41 is provided for detecting oxygen concentration of the conditioned air flowing through the piping 40. As shown in FIG. 3, the oxygen concentration sensor 41 is connected to the control device 19. The control unit 19 is connected to a pressure sensor 42 as a device for measuring a pressure inside the cabin, a temperature sensor 45 as a device for measuring a temperature inside the cabin, and a moisture sensor 46 as a device for measuring humidity inside the cabin. The control device 19 functions as an oxygen partial pressure value determination device that finds an oxygen partial pressure $P_a$ of the conditioned air introduced from the conditioning chamber 16e into the piping 40 on the basis of an oxygen concentration in the conditioned air that is measured by the oxygen concentration sensor 41 and a pressure $P_c$ inside the cabin that is measured by the pressure sensor 42.

The control device 19 includes a storage device that stores a preset relationship between a pressure inside the cabin and a target partial pressure. The stored relationship is set such that the target partial pressure exceeds a value obtained by multiplying a pressure inside the cabin by an oxygen concentration ratio in the air on the earth's surface and is equal to or less than an oxygen partial pressure in the air on the earth's surface. To be more precise, a relationship is set for determining a target partial pressure $P_a^*$ that satisfies the relationship $\alpha P_c < P^* = P_g$, where P* stands for a target partial pressure, $P_c$ stands for a pressure inside the cabin, $\alpha$ (about 0.209) stands for an oxygen concentration ratio in the air on the earth's surface, and $P_g$ (about 212 hPa) stands for an oxygen partial pressure in the air on the earth's surface. A specific relationship may be determined experimentally so as to determine the target partial pressure $P_a^*$ that can raise the comfort level of the passengers. For example, a relationship is stored in which a value obtained by adding $k(P_g - \alpha P_c)$ obtained by multiplying a deviation $(P_g - \alpha P_c)$ by a predetermined coefficient k ($0<k<1$) to $\alpha P_c$ is taken as the target partial pressure $P_a^*$. As a result, for example, when the pressure $P_c$ inside the cabin is a pressure at an altitude of 2438 m (8000 ft), the target partial pressure $P_a^*$ of oxygen in the conditioned air is taken as an oxygen partial pressure in the air at an altitude of 1524 m (5000 ft), and the target partial pressure $P_a^*$ in this case corresponds to an oxygen concentration of about 23.5%. As a result, the conditioned air is conditioned so that the oxygen concentration thereof is higher than the oxygen concentration in the air on the earth's surface and the oxygen partial pressure thereof is lower than the oxygen partial pressure in the air on the earth's surface.

The control device 19 controls the oxygen-enriched air generator 16 so that the oxygen partial pressure of the conditioned air introduced from the piping 40 into the cabin 8 becomes the target partial pressure $P_a^*$. Thus, the control device 19 functions as a target partial pressure value determination device that finds the target partial pressure $P_a^*$ on the basis of the stored relationship and the pressure $P_c$ inside the cabin that has been measured by the pressure sensor 42, and adjusts the opening degree of the flow rate control valves 16b, 16c, and 16d so as to reduce the difference between the found target partial pressure $P_a^*$ and the found oxygen partial pressure $P_a$. As a result, a flow rate of the oxygen-enriched air introduced form the selectively permeable membrane 16a into the conditioning chamber 16e is regulated.

The conditioned air can be conditioned by humidifying the air inside the conditioning chamber 16e with the moisture regenerator 80 so that the humidity increases above the average humidity of the entire air inside the cabin 8. In this case, the relative humidity of the air inside the conditioning chamber 16e is preferably maintained at a value equal to or higher than 20%. An adequate pressure inside the cabin 8 is maintained by controlling the outflow valve 35 by signals from the control device 19 on the basis of the pressure inside the cabin 8 that is detected by the pressure sensor 42 and the altitude information sent from control mechanisms of the aircraft. Further, the temperature inside the cabin 8 can be regulated by controlling the flow rate control valve 4, hot air modulator valve 12, flow rate control valve 18, and switching valve 33 by signals from the control device 19 on the basis of the temperature inside the cabin 8 that is detected by the temperature sensor 45.

The piping 40 has branching ends disposed inside the cabin 8, and an air blow-off ports 40a communicating with the oxygen-enriched gas generator 16 is provided at each branching end. Each air blow-off port 40a is disposed in a position in which the conditioned air is blown so as to reach each of face disposition regions of the passengers in a plurality of seat locations inside the cabin 8.

Figure 4:
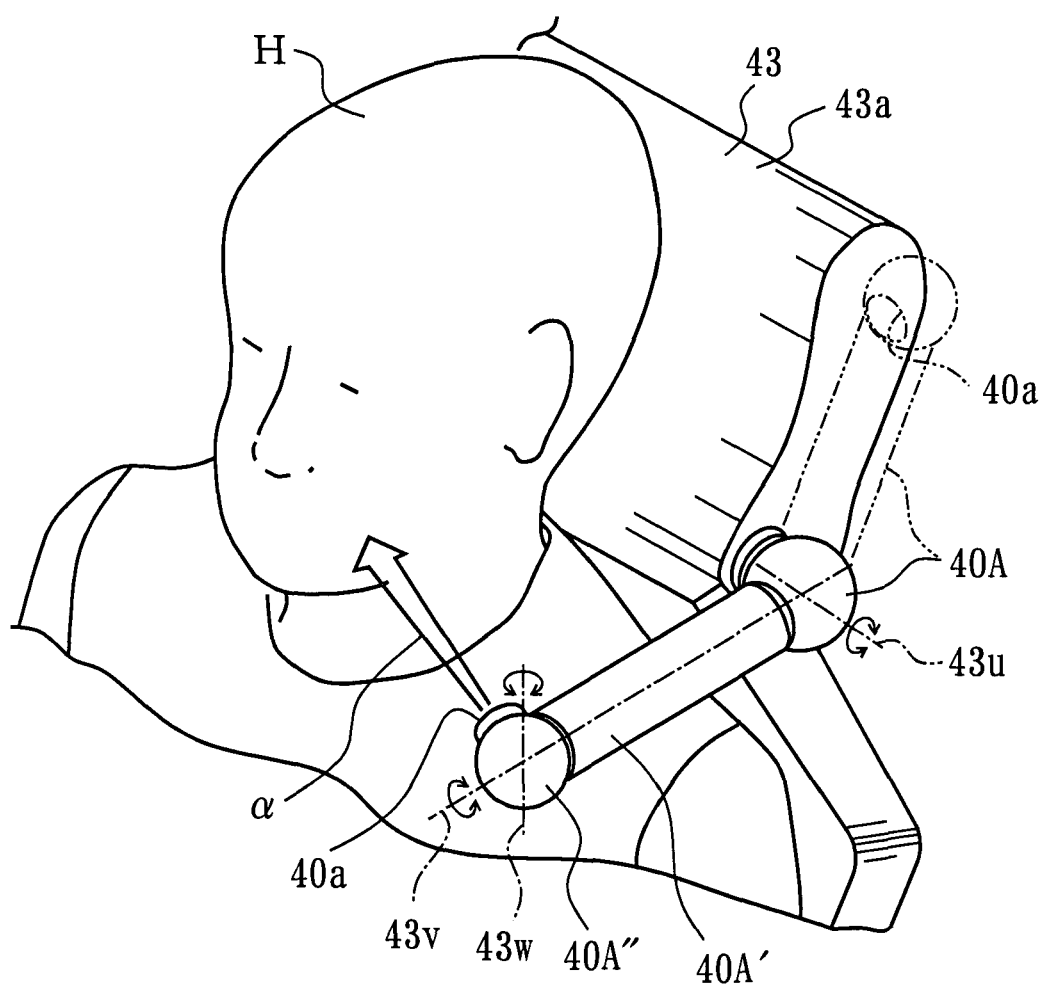
FIG. 4 A perspective view illustrating a conditioned air supply state in the conditioned air supply system for an aircraft of the embodiment of the present invention.

Thus, as shown in FIG. 4, the piping 40 has a plurality of ducts 40A each configuring the branching end. The ducts 40A are attached to a plurality of seats 43 respectively in the aircraft, and one air blow-off port 40a is provided in each duct 40A. A plurality of blow-off ports 40a also may be provided in each duct 40A. The duct 40A of the present embodiment has a main body 40A' in the form of an almost straight tube and a hollow sphere shaped distal end portion 40A" supported by one end side of the main body 40A', in which the air blow-off port 40a is formed in the distal end portion 40A".

The main body 40A' is attached to a side surface of a headrest 43a of the seat 43 at the other end side thereof so as to be able to swing about a first axis 43u extending in the transverse direction of the seat 43 and be positioned by friction, a click, or the like. The distal end portion 40A" is supported by the main body 40A' via a ball joint so as to be able to rotate about a second axis 43v, which is perpendicular to the first axis 43u and extends in the longitudinal direction of the main body 40A', and be able to positioned by friction, a click, or the like, also the distal end portion is attached so as to be able to swing about a third axis 43w perpendicular to the second axis 43v and be positioned by friction, a click, or the like. As a result, the posture of the duct 40A can be changed between a usage posture shown by a solid line in FIG. 4 and a withdrawal posture shown by a chain line by swinging about a first axis 43u.

When the duct 40A is in the usage posture, the conditioned air is introduced from a disposition portion of the piping 40 inside the seat 43 into the main body 40A' of the duct 40A, guided through the distal end portion 40A", and blown from the air blow-off port 40a as shown by an arrow $\alpha$. Thus, when the duct 40A is in the usage posture, the distal end portion 40A" is disposed close to the face disposition region of a passenger H in the seat location, thereby making it possible to blow the conditioned air from the air blow-off port 40a so that the conditioned air reaches the face disposition region. Furthermore, the blow-off direction of the conditioned air can be adjusted by rotating the distal end portion 40A" about the second axis 43v and swinging the distal end portion about the third axis 43w to the main body 40A'. As a result, the conditioned air can be blown toward the face disposition region, toward the vicinity of the face disposition region, or toward the face disposition region and the vicinity of the face disposition region. When the duct 40A is in the withdrawal posture, the duct 40A is disposed along the side surface of the headrest 43a, that is, in the region in which it does not interfere with the movement region of the passenger H inside the cabin 8.

When the seat 43 is disposed beside the window or a wall inside the cabin 8, the duct 40A may be attached to the aircraft fuselage rather than to the seat 43.

In the above-described embodiment, the pressure $P_c$ inside the cabin of a flying aircraft is measured, a target pressure $P_a^*$ that exceeds a value obtained by multiplying the measured pressure $P_c$ inside the cabin by an oxygen concentration ratio a in the air on the earth's surface and is equal to or less than the oxygen partial pressure $P_a$ in the air on the earth's surface is found, oxygen-enriched air containing oxygen of the found target partial pressure $P_a^*$ is generated by the oxygen-enriched air generator 16, and the generated oxygen-enriched air can be blown as the conditioned air via a plurality of air blow-off ports 40a so as to reach each of the face disposition regions of passengers H in a plurality of seat locations inside the cabin 8. Furthermore, the humidity of the conditioned air can be increased over the average humidity of the entire air in the cabin 8. By blowing the conditioned air in a converging manner so that it reaches each of the face disposition regions of passengers H inside the cabin 8, it is possible to reduce remarkably a flow rate of the conditioned air having improved oxygen partial pressure and humidity by comparison with the case in which oxygen partial pressure and humidity of the entire air inside the cabin 8 are increased. Furthermore, the comfort level can be raised by making it easier for the passengers to breathe without increasing the probability of fire occurrence. In addition, the comfort level of the passengers can be raised without raising the probability of condensation occurrence. For example, where moist air is present around the faces of passengers H, mucous membranes of mouth and nose can be prevented from drying and contact lenses can be prevented from falling out. Because the oxygen concentration is high and the oxygen partial pressure is low in the conditioned air in comparison with those of the air on the earth's surface, the probability of fire occurrence can be further reduced. Because each duct 40A can change its posture between the usage posture and the withdrawal posture, the conditioned air is supplied to the passenger H only when necessary, and the movement of passenger H is prevented from being hindered when the supply of conditioned air is not required. Furthermore, by controlling the flow rate of the oxygen-enriched air introduced into the conditioning chamber 16e, the oxygen partial pressure in the conditioned air can be controlled easily; and by humidifying the oxygen-enriched air inside the conditioning chamber 16e with moisture recovered by the moisture regenerator 80, the comfort level can be raised.

Figure 5:
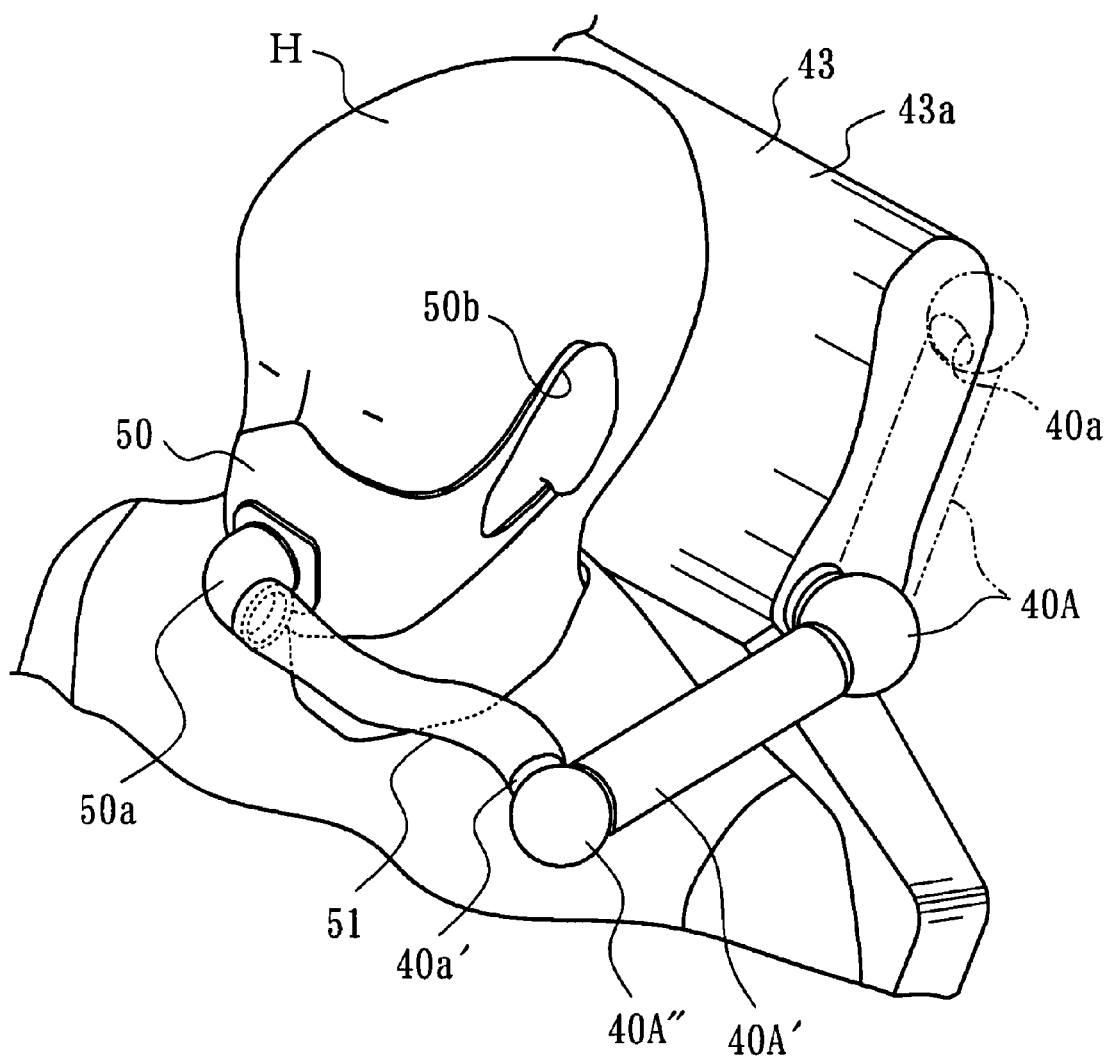
FIG. 5 A perspective view illustrating a conditioned air supply state in the conditioned air supply system for an aircraft of the first modification example of the present invention.

In a first modification example shown in FIG. 5, a mask 50 that is attachable to the face of passenger H and a tube 51 connected to the mask 50 are provided.

The mask 50 has a typical three-dimensional shape that ensures space for the mouth of passenger H and comprises a piping connection device 50a linked to the mouth space and openings 50b for suspending the mask on the ears of passenger H. The mask is preferably made from an air-permeable fabric such as nonwoven fabric, and the piping connection device 50a is preferably molded from a lightweight plastic. The tube 51 is preferably molded from a lightweight flexible material such as a polyethylene film.

One end of the tube 51 is attached to the mask 50 by being detachably fitted to an annular portion extending from a circumferential edge of an opening of the piping connection device 50a. The other end of the tube 51 is attached to the piping 40 by being detachably fitted to an annular portion 40a' extending from a circumferential edge of the air blow-off port 40a of the piping 40. As a result, the conditioned air introduced from the air blow-off port 40a into the tube 51 is supplied via the mask 50 to the passenger H.

Because the tube 51 is detachably attached to the piping 40, the conditioned air can be reliably supplied via the mask 50 as the passenger H desired, and the mask 50 can be discarded after use, which is preferred from the standpoint of sanitary. By making the mask 50 from an air permeable material, it is possible to release extra conditioned air or breath from between the mask 50 and the face. Virus contamination or the like inside the cabin 8 can be prevented by supplying the conditioned air to the passenger H via the mask 50 after purifying, for example, by removing bacilli and dust with a filter. Other aspects are identical to those of the above-described embodiment.

Figure 6:
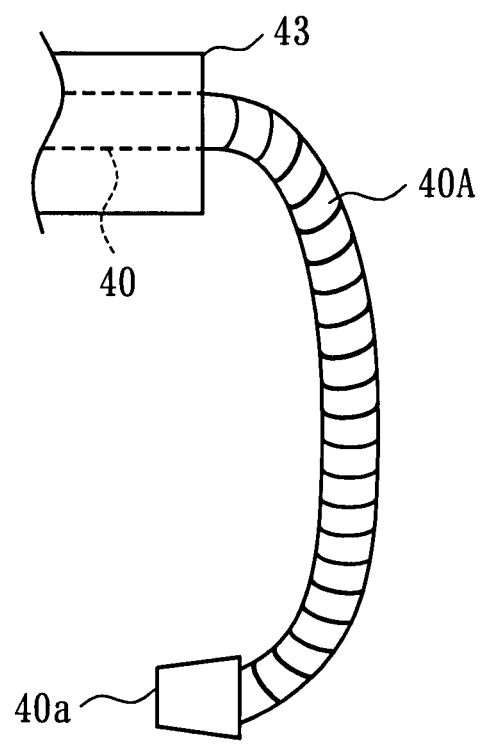
FIG. 6 A diagram illustrating a duct of the conditioned air supply system for an aircraft of the second modification example of the present invention.

In the second modification example shown in FIG. 6, the duct 40A is configured by a flexible tube, so that the posture thereof can be changed between the usage posture and withdrawal posture and the blow-off direction of the conditioned air can be adjusted. Other aspects are identical to those of the above-described embodiments.

Figure 7:
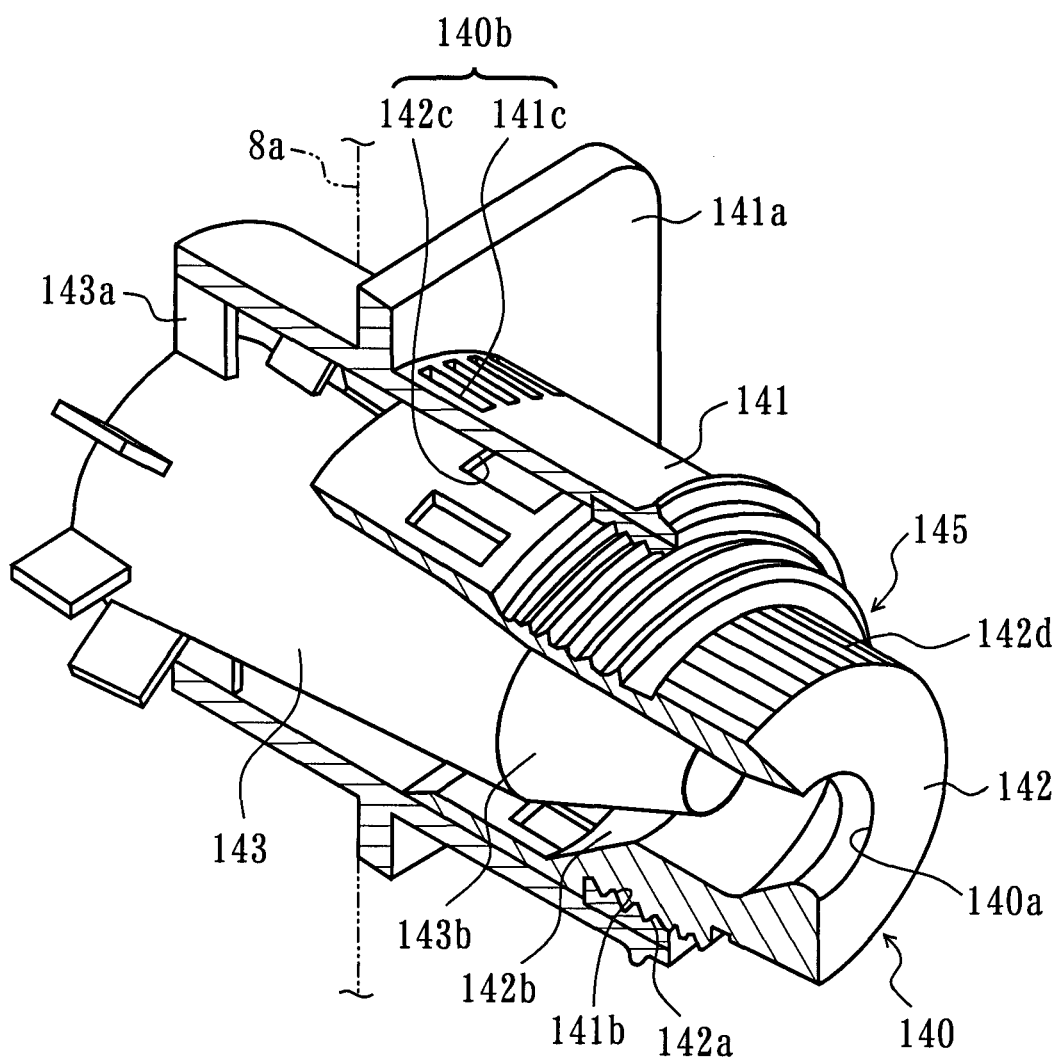
FIG. 7 A partially cut-out perspective view of a nozzle of the conditioned air supply system for an aircraft of the third modification example of the present invention.

The piping 40 shown in the third modification example shown in FIG. 7 has a plurality of nozzles 140 constituting respective branching ends instead of a plurality of ducts 40A. The nozzles 140 are attached to the aircraft fuselage or respective seats 43.

The nozzle 140 of the present modification example has an outer tube 141, an inner tube 142, and a cone 143. The outer tube 141 is attached via a flange 141a, for example, to a fuselage 8a constituting the ceiling of the cabin 8. Where the ceiling of the cabin 8 is high, the nozzle 140 may be attached, for example, to a backside of the backrest of the seat 43, and the conditioned air may be blown so as to reach the face disposition region of the passenger H in a seat facing the backside of the backrest. The inner tube 142 is screwed into the outer tube 141 via a female thread 141b formed on the inner circumference of the outer tube 141 and a male thread 142a formed on the outer circumference of the inner tube 142. A base end portion of the cone 143 is fixed via a spacer 143a to the inner circumference of the outer tube 141. The outer circumference of a distal end side of the cone 143 is a taper surface 143b, and an inclined surface 142b following a conical surface is formed on the inner circumference of the inner tube 142 facing the taper surface 143b. An air blow-off port 140a is provided at the distal end of the inner tube 142. Roulette grooves 142d are formed so that the outer circumference of the distal end side of the inner tube 142 can be easily pinched.

The generated conditioned air is introduced into the nozzle 140 from a channel between the inner circumference of the outer tube 141 and the outer circumference of the cone 143, passes through a channel between the inclined surface 142b and the taper surface 143b, and is blown from the air blow-off port 140a so as to reach each of the face disposition regions of passengers H in a plurality of seat locations inside the cabin 8. The inner tube 142 can be moved in the axial direction by changing the amount of screwing into the outer tube 141, thereby changing the channel area between the inclined surface 142b and the taper surface 143b; therefore it is possible to adjust the blow-off flow rate of the conditioned air from the air blow-off port 140a. Thus, an adjustment mechanism 145 for the blow-off flow rate of the conditioned air from the air blow-off port 140a is provided.

Auxiliary air blow-off ports 140b are configured by outer openings 141c formed in the circumferential wall of the outer tube 141 and inner openings 142c formed in the circumferential wall of the inner tube 142. When the blow-off flow rate of the conditioned air from the air blow-off port 140a is at its maximum, the outer openings 141c are closed by the circumferential wall of the inner tube 142, and the inner openings 142c are closed by the circumferential wall of the outer tube 141. As the blow-off flow rate of the conditioned air from the air blow-off port 140a reduces with moving the inner tube 142 in the axial direction to the outer tube 141, the overlap area of the outer openings 141c and inner openings 142c gradually increases and the blow-off flow rate of the conditioned air from the auxiliary air blow-off ports 140b gradually rises. Thus, in each nozzle 140, the blow-off flow rate of the conditioned air can be adjusted so that the blow-off flow rate of the conditioned air from the auxiliary air blow-off ports 140b decreases when the blow-off flow rate of the conditioned air from the air blow-off port 140a increases, and the blow-off flow rate of the conditioned air from the auxiliary air blow-off ports 140b increases when the blow-off flow rate of the conditioned air from the air blow-off port 140a decreases. The auxiliary air blow-off port 140b is disposed in a position where the conditioned air is blown toward the region separated from the face disposition region of the passenger H. As a result, the flow rate of conditioned air necessary for the passenger H is adjusted and the remaining conditioned air is scattered inside the cabin, thereby making it possible to maintain an almost constant supply of air having improved oxygen partial pressure and humidity and stabilize the oxygen partial pressure and humidity of the supplied air. Other aspects are identical to those of the above-described embodiment.

Figure 8:
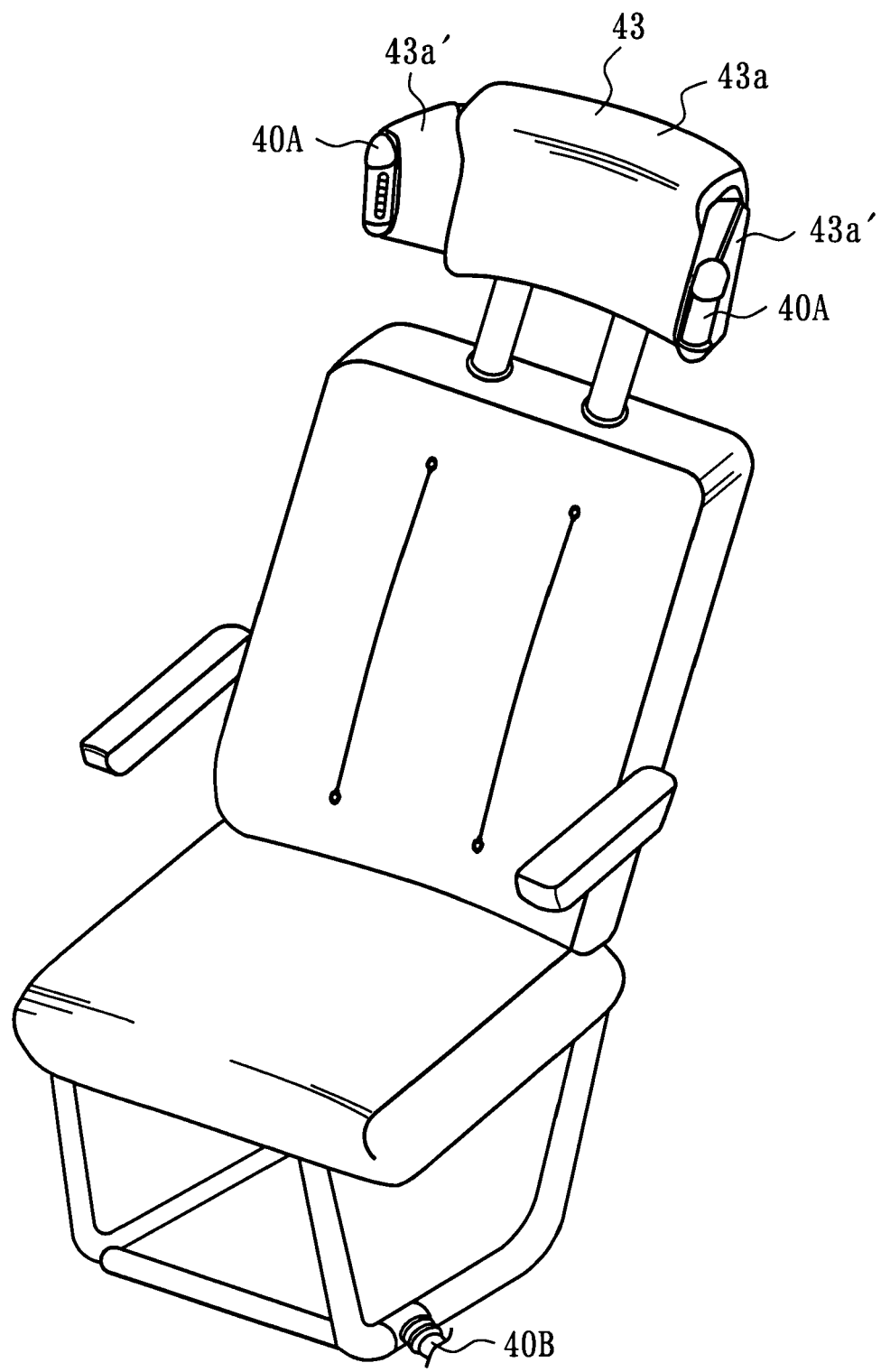
FIG. 8 A perspective view illustrating a conditioned air supply state in the conditioned air supply system for an aircraft of the fourth modification example of the present invention.
Figure 9:
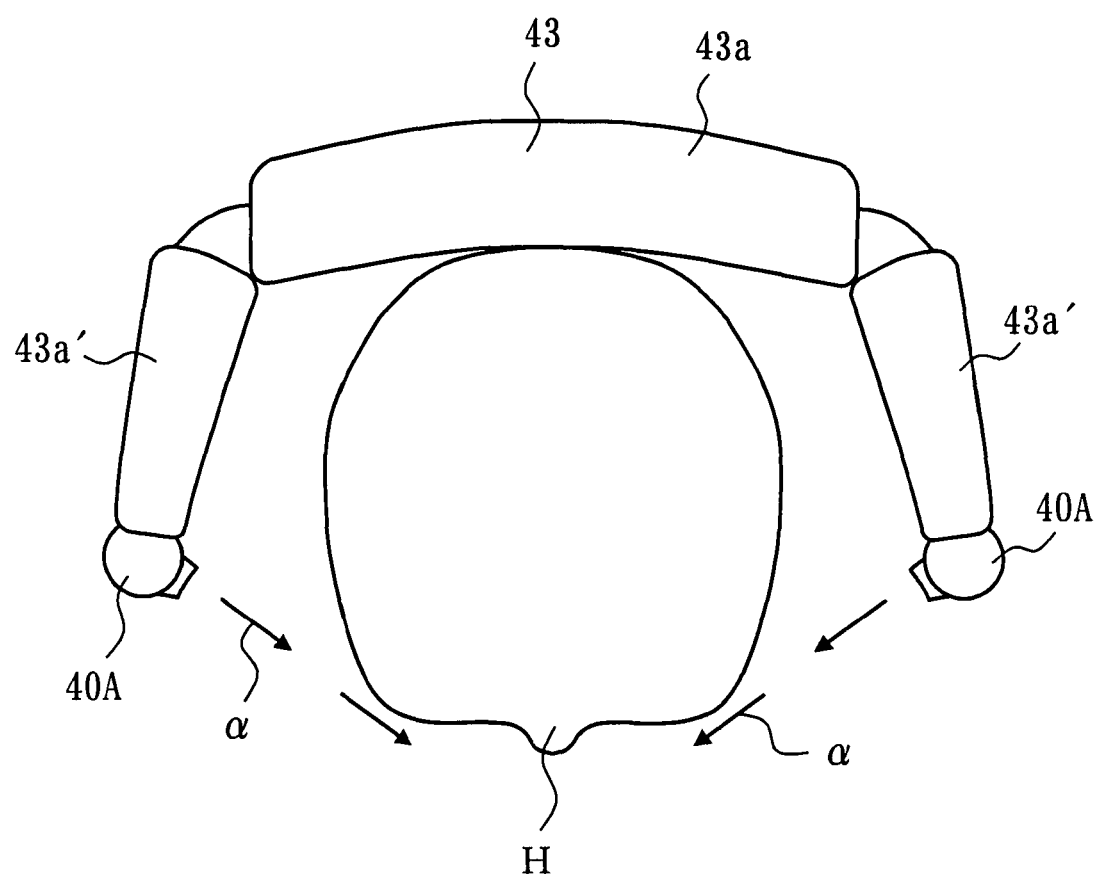
FIG. 9 A plan view illustrating a conditioned air supply state in the conditioned air supply system for an aircraft of the fourth modification example of the present invention.
Figure 10:
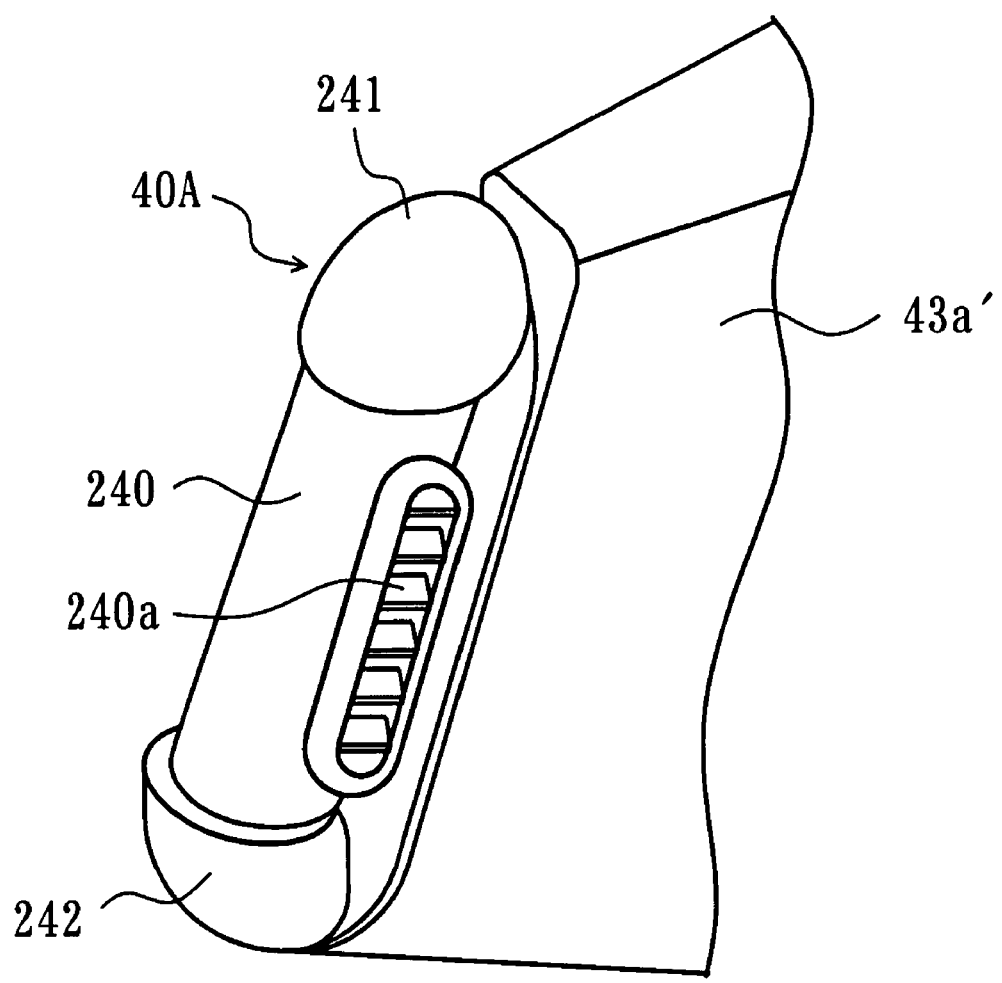
FIG. 10 A diagram illustrating a duct of the conditioned air supply system for an aircraft of the fourth modification example of the present invention.

In the fourth modification example shown in FIGS. 8 to 10, ducts 40A are provided in the left and right end portions of the headrest 43a having wing portions 43a'. Each duct 40A in the present modification example has a cylindrical main body 240 and joining portions 241, 242 each of which are attached to respective ends of the main body 240. Both joining portions 241, 242 are fixed to the wing portion 43a', and the main body 240 is rotatably supported by both joining portions 241, 242. A louver-shaped air blow-off port 240a is formed in the main body 240. The generated conditioned air that is entered in the seat via a connection piping 40B of the piping 40 is introduced into the joining portions 241, 242 of the ducts 40A via a portion disposed in the seat 43, and blown from the air blow-off ports 240a after passing through the main bodies 240 toward the vicinity of the face disposition region as shown by arrows α in FIG. 9. The conditioned air blown from both air blow-out ports 240a slowly flow from both sides of the head of passenger H supported by the headrest 43a toward the center along the face, and the flows meet with each other in the center to reach the face of passenger H. The main body 240 can rotate about its own axis to the joining portions 241, 242 with making it possible to adjust the blow-off direction of the conditioned air, thereby the conditioned air can be blown toward the face disposition region or can be blown toward the face disposition region and the face disposition region; other aspects are identical to those of the above-described embodiment.

The present invention is not limited to the above-described embodiments and modification examples. For example, both the oxygen concentration and humidity of the conditioned air in the above-described embodiments are adjusted, but it is also possible to adjust only the oxygen concentration or the humidity. When only the humidity of the conditioned air is adjusted, the configuration for introducing the oxygen-enriched air separated by the selectively permeable membrane 16a into the conditioning chamber 16e in the above-described embodiments is unnecessary, and when only the oxygen concentration of the conditioned air is adjusted, the configuration for humidifying the conditioning chamber 16e by moisture recovered by the moisture regenerator 80 in the above-described embodiments is unnecessary. Furthermore, a selectively permeable membrane with an oxygen permeability lower than nitrogen permeability may be used in the oxygen-enriched air generator.

The invention claimed is:

1. A conditioned air supply system for an aircraft, comprising:
    an oxygen-enriched air generator that generates oxygen-enriched air as conditioned air in said aircraft;
    a measurement device that measures a pressure inside a cabin of said aircraft; a storage device that stores a preset relationship between a pressure inside said cabin and a target partial pressure; said relationship being set so that said target partial pressure exceeds a value obtained by multiplying the pressure inside said cabin by an oxygen concentration ratio in the air on the earth's surface and is equal to or less than an oxygen partial pressure in the air on the earth's surface;
    a target partial pressure determination device that finds said target partial pressure on the basis of said relationship and the measured pressure inside said cabin;
    a control device that controls said oxygen-enriched air generator so that an oxygen partial pressure of the generated conditioned air becomes said target partial pressure;
    a piping having a plurality of air blow-off ports connected to said oxygen-enriched air generator; said air blow-off ports being disposed in locations in which said conditioned air can be blown so as to reach respective face disposition regions of passengers in a plurality of seat locations inside said cabin; and
    a mixing chamber that introduces a flow of air having oxygen concentration lower than the oxygen concentration of the conditioned air to areas of the cabin other than the face disposition regions of the cabin where the conditioned air is blown.

2. The conditioned air supply system for an aircraft according to claim 1, wherein said piping has a plurality of branching ends, and said branching ends are configured by a plurality of ducts, each duct being attached to each of a plurality of seats or to a fuselage of said aircraft, said air blow-off port is provided in each duct, and each duct can change a posture thereof between a usage posture in which said conditioned air is blown from said air blow-off port so as to reach said face disposition region and a withdrawal posture in which it is disposed in a region that does not interfere with a movement region of a passenger inside said cabin.

3. The conditioned air supply system for an aircraft according to claim 1, further comprising: a mask that is attachable to a passenger face; a flexible tube connected to said mask; and said tube being detachably attached to said piping, wherein said conditioned air introduced from said air blow-off port into said tube attached to said piping is supplied to the passenger via said mask.

4. The conditioned air supply system for an aircraft according to claim 1, wherein said piping has a plurality of nozzles, each nozzle being attached to each of a plurality of seats or to a fuselage of said aircraft, said air blow-off port and an auxiliary air blow-off port are provided in each nozzle, in each nozzle, said auxiliary air blow-off port is disposed in a location in which said conditioned air is blown toward a region separated from said face disposition region, and each nozzle is provided with a mechanism for adjusting a blow-off flow rate of said conditioned air so that the blow-off flow rate of said conditioned air from said auxiliary air blow-off port decreases when the blow-off flow rate of said conditioned air from said air blow-off port increases, and the blow-off flow rate of said conditioned air from said auxiliary air blow-off port increases when the blow-off flow rate of said conditioned air from said air blow-off port decreases.

5. The conditioned air supply system for an aircraft according to claim 1, wherein said oxygen-enriched air generator comprises a selectively permeable membrane that separates high-pressure air supplied from a high-pressure air supply source into oxygen-enriched air and nitrogen-enriched air, a conditioning chamber into which the oxygen-enriched air separated by said selectively permeable membrane and air whose oxygen concentration is lower than that of the oxygen-enriched air separated by said selectively permeable membrane are introduced, and a flow rate control valve for the oxygen-enriched air introduced into said conditioning chamber, and a moisture regenerator that recovers moisture contained in the air discharged from said cabin and humidifies the air inside said conditioning chamber with the recovered moisture is provided.

6. The conditioned air supply system for an aircraft according to claim 5, wherein an oxygen partial pressure determination device that finds an oxygen partial pressure of the oxygen-enriched air introduced from said conditioning chamber into said piping is provided, and an opening degree of said flow rate control valve is adjusted by said control device so as to reduce a difference between said found target partial pressure and said found oxygen partial pressure.

7. The conditioned air supply system for an aircraft according to claim 6, wherein:
    a part of the air supplied from said high-pressure air supply source is introduced into said mixing chamber, and
    a part of the air flowed out from said cabin returns into said cabin via said mixing chamber.

8. The conditioned air supply system for an aircraft according to claim 5, wherein:
    a part of the air supplied from said high-pressure air supply source is introduced into said mixing chamber, and a part of the air flowed out from said cabin returns into said cabin via said mixing chamber.

\* \* \* \* \*